United States Patent [19]
Tomita et al.

[11] Patent Number: 5,999,501
[45] Date of Patent: Dec. 7, 1999

[54] OBJECTIVE LENS ACTUATOR AND METHOD FOR PRODUCING THE SAME

[75] Inventors: Hironori Tomita, Ikoma; Takuya Wada, Katano; Satoshi Obase, Osaka; Tohru Nakamura, Katano, all of Japan

[73] Assignee: Matsushita Electric Industrial Co., Ltd., Osaka-fu, Japan

[21] Appl. No.: 09/004,917

[22] Filed: Jan. 9, 1998

[30] Foreign Application Priority Data

Jan. 10, 1997 [JP] Japan ..................... 9-002658

[51] Int. Cl.$^6$ ....................................... G11B 7/00
[52] U.S. Cl. .................. 369/44.15; 359/813; 359/823
[58] Field of Search .................. 369/44.11, 44.14, 369/44.15, 44.16, 44.22; 359/813, 814, 823, 824, 819

[56] References Cited

U.S. PATENT DOCUMENTS 5,521,762  5/1996  Tomiyama et al. .

FOREIGN PATENT DOCUMENTS 8-87766   4/1996  Japan .
8-306059  11/1996 Japan .

*Primary Examiner*—Paul W. Huber
*Attorney, Agent, or Firm*—Wenderoth, Lind & Ponack, L.L.P.

[57] ABSTRACT

A lens holder 2 holds an objective lens 1. Wires 5a~5d movably support the lens holder 2 relative to a stationary member 6 in a tracking direction and in a focus direction. The wires 5a~5d are integrally formed with the lens holder 2 and the stationary member 6 and one end and the other end of each of the wires are buried in the lens holder 2 and the stationary member 6. At a time of the integral molding, parts of the buried portions of the wires 5a~5d are exposed in notches 2a~2d and 6a~6d to be in contact with a mold for molding, thereby injection pressure of a molding material is received by the mold. This makes it possible to prevent deformation of the wires 5a~5d due to the injection pressure of the molding material, resulting in reducing inclination during actuation and degradation of frequency response characteristic.

3 Claims, 8 Drawing Sheets

5,999,501

OBJECTIVE LENS ACTUATOR AND METHOD FOR PRODUCING THE SAME

BACKGROUND OF THE INVENTION

1. Field of the Invention

The present invention relates to objective lens actuators and methods for producing the objective lens actuators, and more specifically to an objective lens actuator to actuate an objective lens for gathering light in a tracking direction and a focus direction relative to a disk-like recording medium such as a MD (mini disc), a CD (compact disc) and a DVD (digital versatile disc), and a method for producing the objective lens a actuator.

2. Description of the Background Art

It is known that an optical disk unit which records and/or reproduces information in/from a disk-like recording medium such as a MD, a CD and a DVD (hereinafter, referred to as an optical disk) is provided with an objective lens actuator for actuating an objective lens which gathers light emitted from a laser light source to apply the light to a recording surface of the optical disk. The objective lens actuator actuates the objective lens on two axes, which are a direction perpendicular to the recording surface of the optical disk (hereinafter, referred to as a focus direction) and a radial direction parallel with the recording surface (hereinafter, referred to as a tracking direction), in order to correct displacement of focus caused by up-and-down movements due to warpage of the optical disk and displacement of tracking caused by decentering and so forth.

FIG. 8 is a perspective view showing a structure of a conventional objective lens actuator disclosed in Japanese Patent Laying-Open No. 8-306059. In FIG. 8, the conventional objective lens actuator includes an objective lens 1, a lens holder 2, a focus coil 3, tracking coils 4a and 4b, wires 5a~5d, a stationary member 6, a magnet 7 and a yoke 8.

The lens holder 2 holding the objective lens 1 is movably supported by the stationary member 6 through the elastic metal wires 5a~5d. That is, the lens holder 2 can move on two axes, which are a focus direction F and a tracking direction T, by the wires 5a~5d which are placed in almost parallel with each other, one ends of which are installed to the lens holder 2 and the other ends of which are installed to the stationary member 6. The stationary member 6 is installed on the yoke 8. The magnet 7 secured on the yoke 8 forms a magnetic circuit cooperating with the yoke 8 to apply a magnetic field to the focus coil 3 and the tracking coils 4a and 4b. The focus coil 3 is fixed to the lens holder 2 and generates an actuation force to actuate the lens holder 2 in the focus direction F. The tracking coils 4a and 4b are fixed to the lens holder 2 and generate the actuation force to actuate the lens holder 2 in the tracking direction T.

Next, operation of the objective lens actuator composed as described in the above will be explained. The actuation force to the focus direction F is generated by a current being applied to the focus coil 3 which is placed within voids of the magnetic circuit formed by the magnet 7 and the yoke 8 and is fixed to the lens holder 2. By the generated actuation force to the focus direction F, the lens holder 2 slidably moves to the focus direction F through the four parallel wires 5a~5d. On the other hand, the actuation force to the tracking direction T is generated by a current being applied to the tracking coils 4a and 4b which are placed within voids of the magnetic circuit formed by the magnet 7 and the yoke 8 and are fixed to the lens holder 2. By the generated actuation force to the tracking direction T, the lens holder 2 moves to the tracking direction T parallel to itself through the four parallel wires 5a~5d.

In the objective lens actuator composed as described in the above, the lens holder 2, the stationary member 6 and the wires 5a~5d are integrally molded (for example, refer to the Japanese Patent Laying-Open No. 8-87766), which leads to such advantages that the objective lens actuator is easy to be assembled and a position of each component becomes more precise. However, the objective lens actuator has a problem that the wires 5a~5d are deformed by injection pressure of a material at a time of molding to degrade performance of the objective lens actuator.

The above-mentioned problem will be described below. FIG. 9~FIG. 11 are top plan views of main portions showing states of molding in a step-by-step manner. FIG. 9 shows the lens holder 2, the stationary member 6 and the wires 5a~5d which are integrally molded, gate positions of a mold to which an injection material is injected (illustrated by black points), directions of material flowing in the mold (illustrated by arrows) and a range of a main portion of the mold (illustrated by diagonally shaded areas). When the objective lens actuator is molded by the mold as shown in FIG. 9, there is a possibility that the wires (only the wires 5a and 5c are illustrated in FIG. 10) are deformed at the time of molding at connecting portions between the wires and the lens holder 2 and at connecting portions between the wires and the stationary member 6. In a case of such deformation, since the wires are not parallel with each other after the mold is removed as shown in FIG. 11, such problems occur as inclination of a motion axis of lens holder 2 during actuation and degradation of frequency response characteristic.

SUMMARY OF THE INVENTION

Therefore, an object of the present invention is to provide an objective lens actuator capable of reducing the inclination during actuation and the degradation of the frequency response characteristic, while keeping the advantages of the integral molding that the objective lens actuator is easy to be assembled and the position of each of the components becomes more precise.

The present invention has the following characteristics to attain the above object.

A first aspect of the present invention is an objective lens actuator actuating an objective lens for gathering light emitted from a light source on a recording surface of a disk-like recording medium in a radial direction parallel with the recording surface of the disk-like recording medium and in an optical axis direction perpendicular to the recording surface of the disk-like recording medium in order to record and/or read information, comprising:

a lens holder holding the objective lens;

a stationary member;

a plurality of elastic members which are integrally molded with the lens holder and the stationary member, one ends of which are buried in the lens holder and the other ends of which are buried in the stationary member, and which movably support the lens holder relative to the stationary member in the optical axis direction and in the radial direction; and an actuation force applying means applying actuation forces in the optical axis direction and the radial direction to the lens holder, wherein each of the elastic members has exposed portions generated by being in contact with a mold at a time of molding in portions where each of the elastic members is buried in the lens holder and/or the stationary member.

As described in the above, according to the first aspect, each of the elastic members has the exposed portions in the portions which are buried in the lens holder and/or the stationary member and the exposed portions are in contact with the mold at the time of molding to receive injection pressure of a molding material and prevent deformation of each of the elastic members. Thereby, it is possible to reduce the inclination during actuation and the degradation of the frequency response characteristic.

A second aspect of the present invention is, in the first aspect, the exposed portions expose each of the elastic members for the full length of the portions where each of the elastic members is buried in the lens holder and/or the stationary member.

As stated above, according to the second aspect, since each of the exposed portions exposes each of the elastic members for the full length of the portions where each of the elastic members is buried, the injection pressure of the molding material can be received by the exposed portions for the full length of the buried portions, preventing the deformation of the elastic members with more reliability.

A third aspect of the present invention is a method for producing an objective lens actuator, wherein the objective lens actuator comprises;

an objective lens for gathering light emitted from a light source on a recording surface of a disk-like recording medium in order to record and/or read information;

a lens holder holding the objective lens;

a stationary member;

a plurality of elastic members movably supporting the lens holder relative to the stationary member in a radial direction parallel with the recording surface of the disk-like recording medium and in an optical axis direction perpendicular to the recording surface of the disk-like recording medium; and an actuation force applying means applying actuation forces in the optical axis direction and the radial direction to the lens holder, each of the elastic members are integrally molded with the lens holder and the stationary member so that one end of each of the elastic members is buried in the lens holder and the other end of each of the elastic members is buried in the stationary member and parts of portions where each of the elastic members is buried in the lens holder and/or the stationary member are made contacted with a mold for molding at a time of the integral molding.

As described in the above, according to the third aspect, when each of the elastic members is integrally molded with the lens holder and the stationary member, parts of the buried portions of each of the elastic members are in contact with the mold for molding to make the mold receive the injection pressure of the molding material and prevent the deformation of the elastic members.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
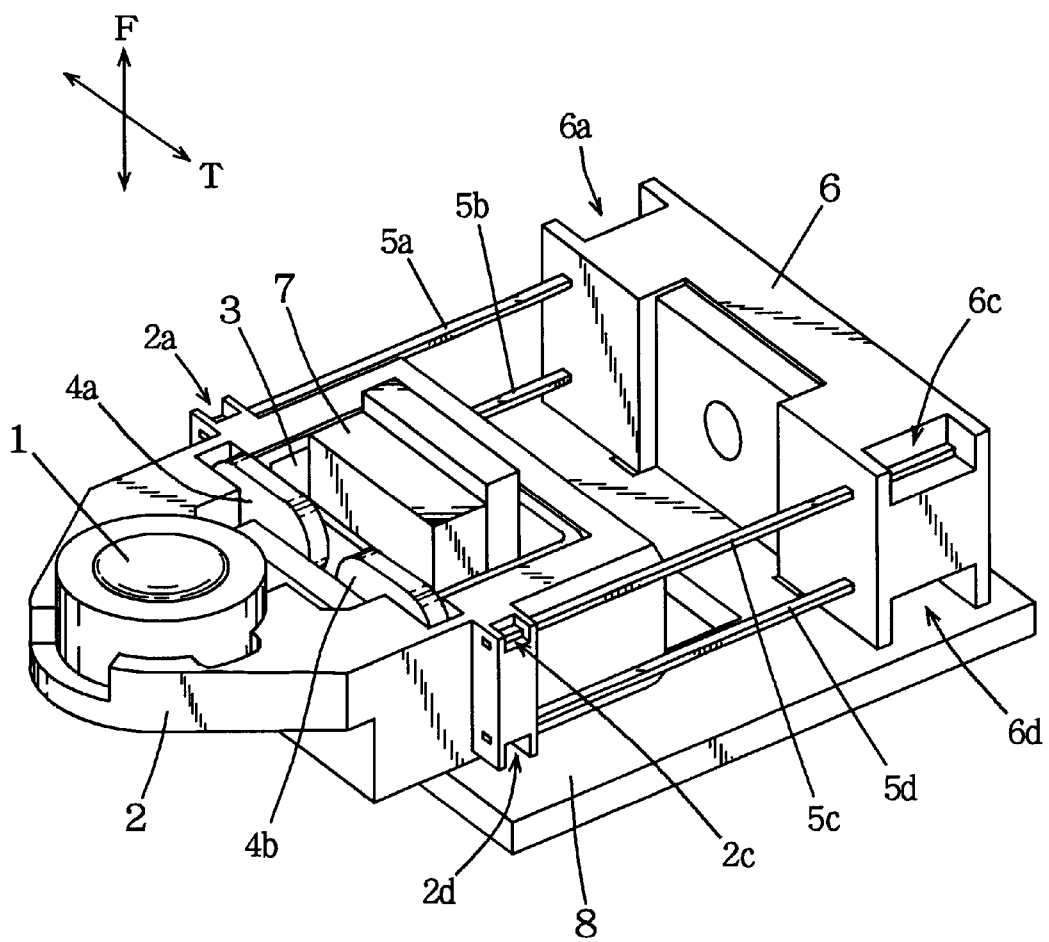
FIG. 1 is a perspective view showing a structure of an objective lens actuator according to a first embodiment of the present invention.
Figure 2:
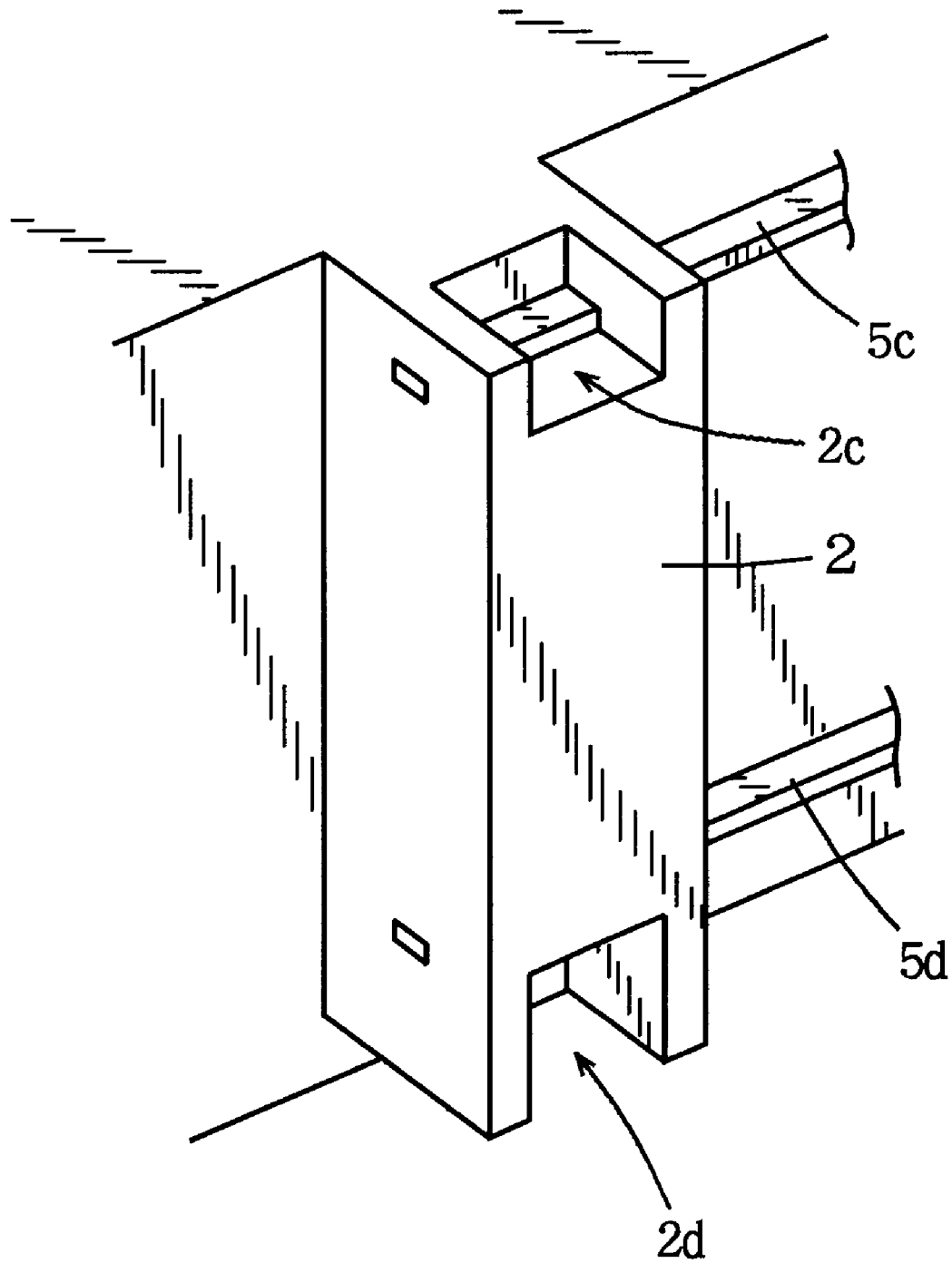
FIG. 2 is a perspective view showing the structure of main portions of the objective lens actuator according to the first embodiment of the present invention.
Figure 3:
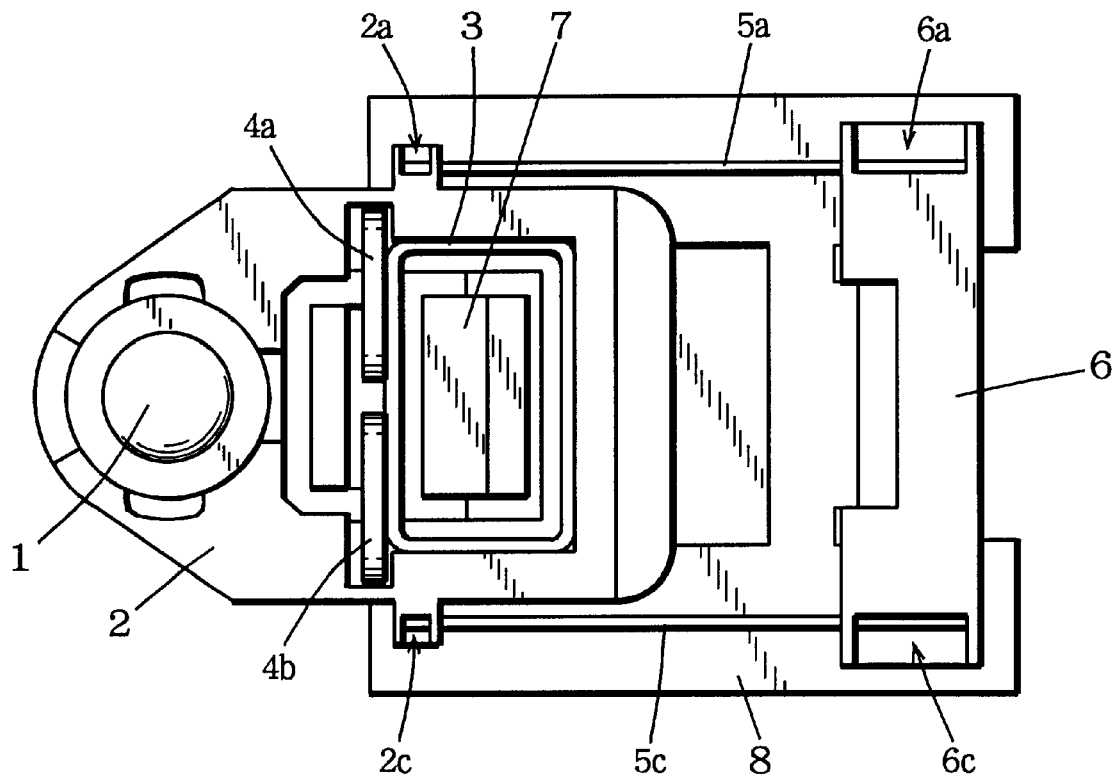
FIG. 3 is a top plan view showing the structure of the objective lens actuator according to the first embodiment of the present invention.
Figure 4:
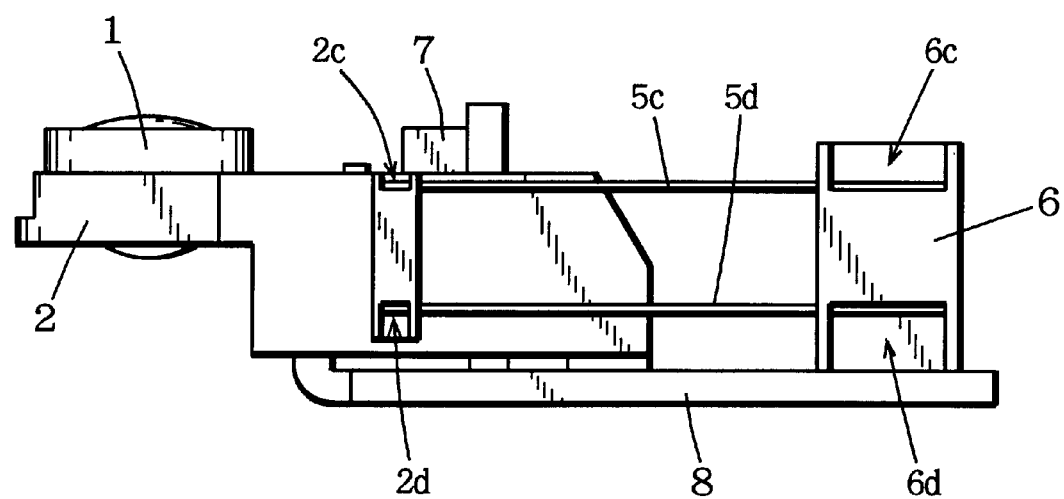
FIG. 4 is a front elevational view showing the structure of the objective lens actuator according to the first embodiment of the present invention.

FIG. 1 is a perspective view showing a structure of an objective lens actuator according the a first embodiment of the present invention. FIG. 2 is a perspective view showing the structure of main portions of the objective lens actuator according to the first embodiment of the present invention. FIG. 3 is a top plan view of the objective lens actuator according to the first embodiment of the present invention. FIG. 4 is a front elevational view of the objective lens actuator according to the first embodiment of the present invention.

Figure 8:
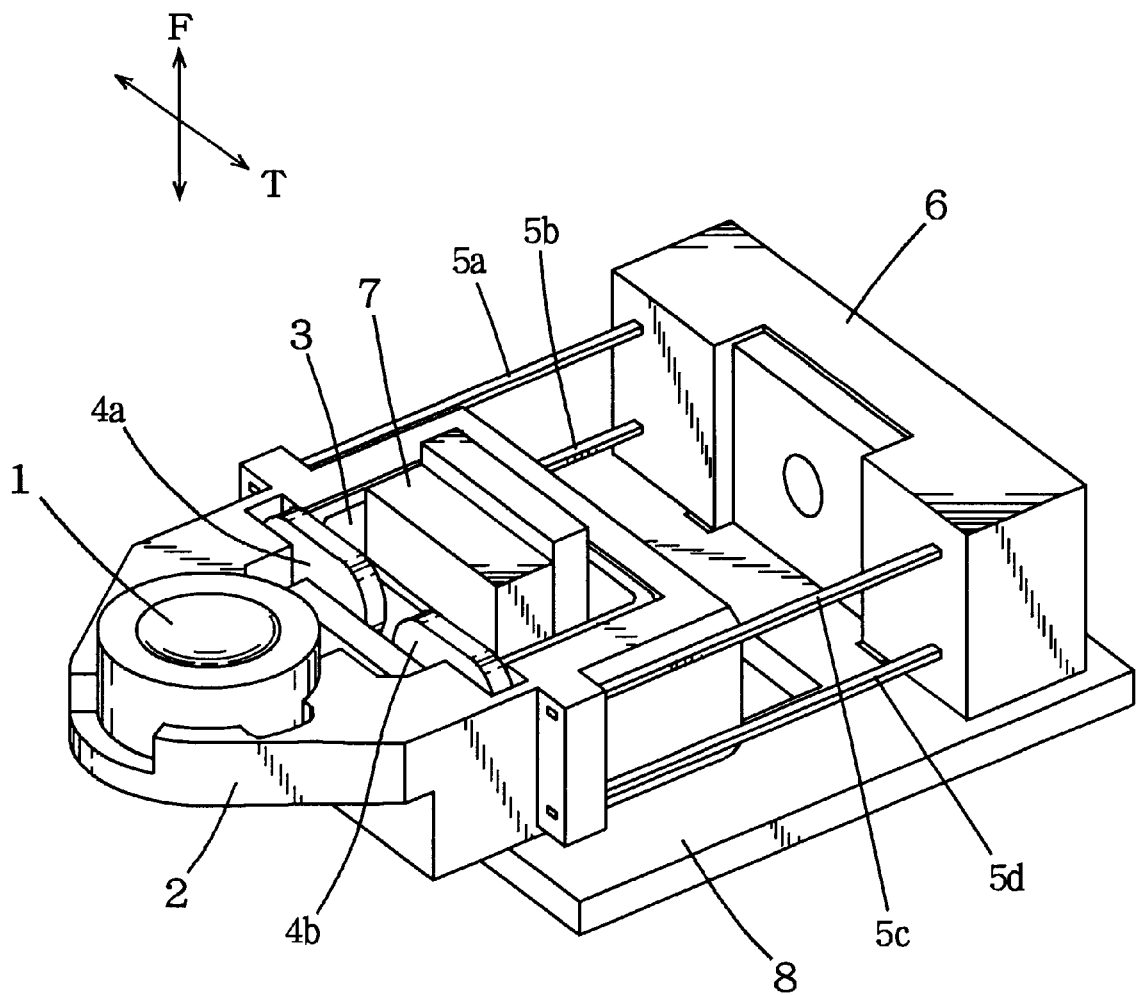
FIG. 8 is a perspective view showing the structure of a conventional objective lens actuator.
Figure 9:
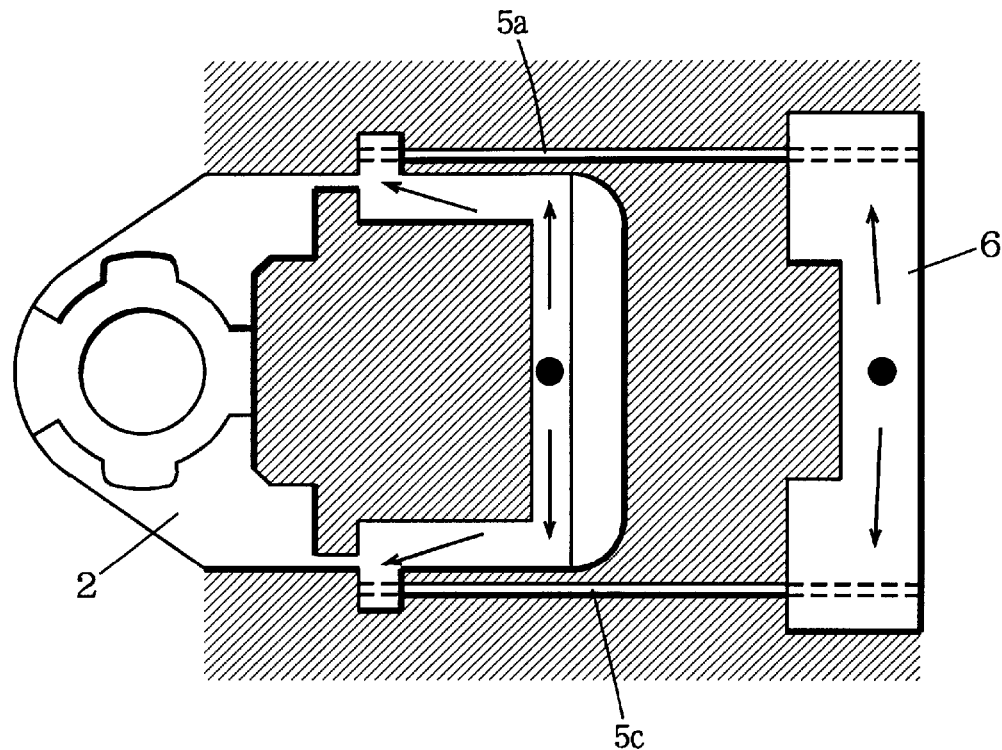
FIG. 9 is a top plan view of the main portion showing the state of molding the conventional objective lens actuator.
Figure 10:
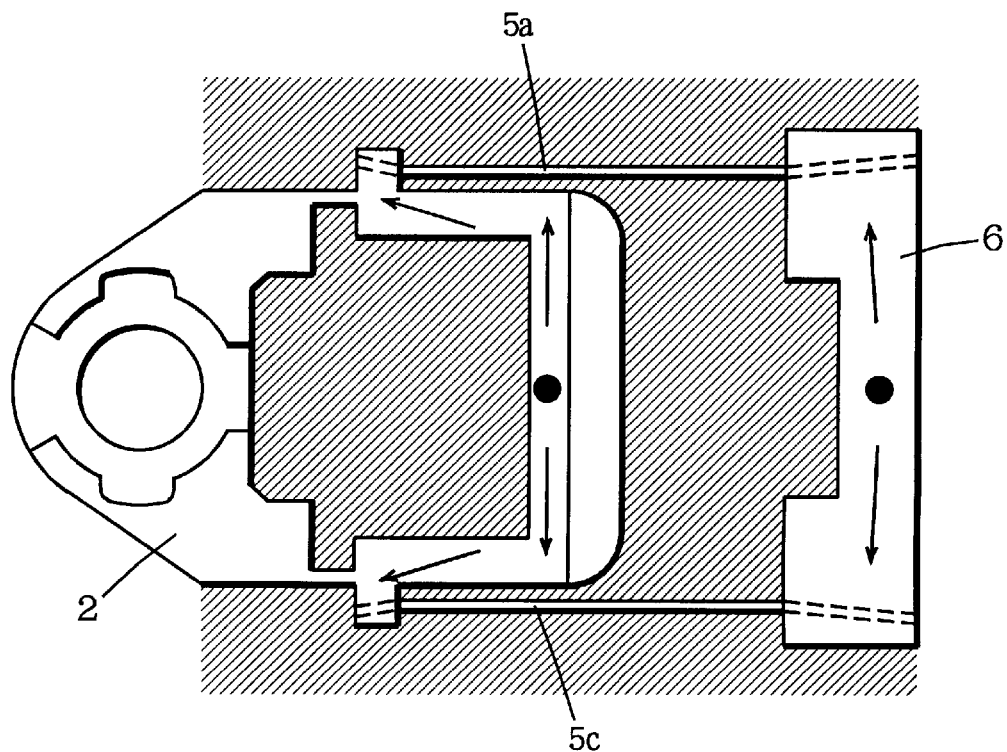
FIG. 10 is a top plan view of the main portion showing the state of molding the conventional objective lens actuator.
Figure 11:
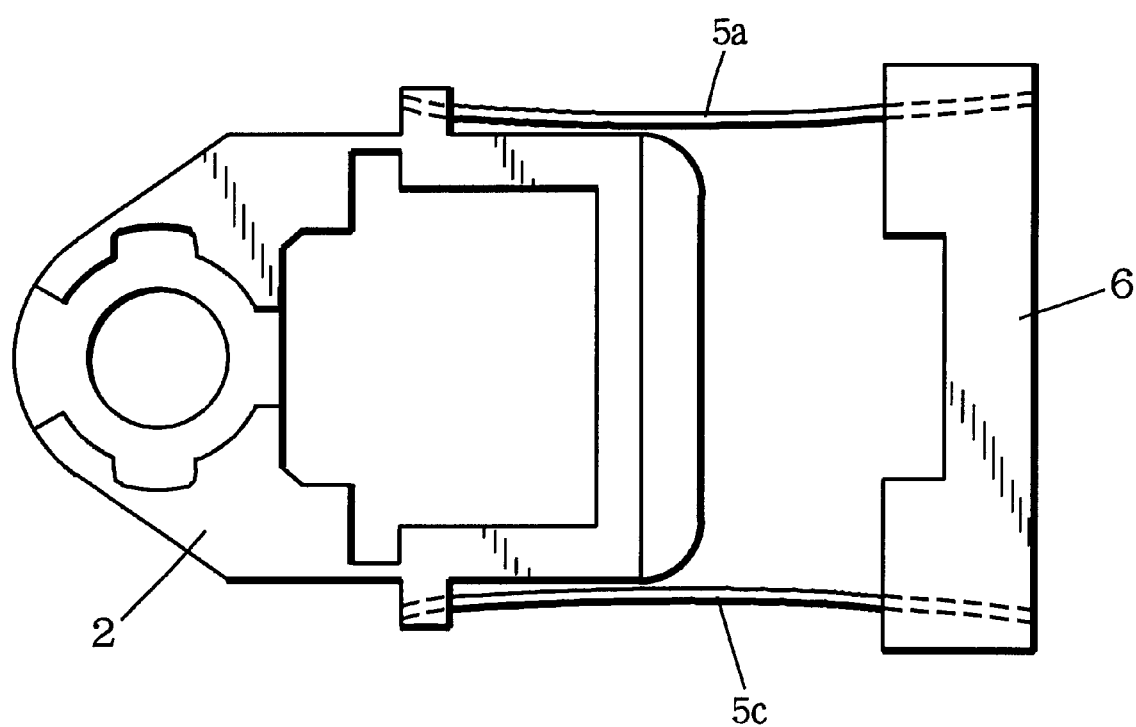
FIG. 11 is a top plan view of the main portion showing the state of molding the conventional objective lens actuator.

In FIG. 1–FIG. 4, the objective lens actuator according to the first embodiment has an objective lens 1, a lens holder 2, a focus coil 3, tracking coils 4a and 4b, wires 5a–5d, a stationary member 6, a magnet 7 and a yoke 8 in common with the conventional objective lens actuator shown in FIG. 8.

The lens holder 2 holding the objective lens 1 is movably supported by the stationary member 6 through the elastic wires 5a~5d. That is, the lens holder 2 can move on two axes, which are a focus direction F and a tracking direction T, by the wires 5a~5d which are placed in almost parallel with each other, one ends of which are installed to the lens holder 2 and the other ends of which are installed to the stationary member 6. The stationary member 6 is installed on the yoke 8. The magnet 7 secured on the yoke 8 forms a magnetic circuit cooperating with the yoke 8 to apply a magnetic field to the focus coil 3 and the tracking coils 4a and 4b. The focus coil 3 is fixed to the lens holder 2 and generates an actuation force to actuate the lens holder 2 in the focus direction F. The tracking coils 4a and 4b are fixed to the lens holder 2 and generate the actuation force to actuate the lens holder 2 in the tracking direction T.

Furthermore, the lens holder 2 and the stationary member 6 are composed of a resin material, for example, PPS, liquid polymer and so forth. Also, the wires 5a~5d are made of metals such as phosphors bronze, beryllium copper and SUS.

Next, operation of the objective lens actuator composed as described in the above will be explained. The actuation force to the focus direction F is generated by a current being applied to the focus coil 3 which is placed within voids of the magnetic circuit formed by the magnet 7 and the yoke 8 and is fixed to the lens holder 2. By the generated actuation force to the focus direction F, the lens holder 2 slidably moves to the focus direction F through the four parallel wires 5a~5d. On the other hand, the actuation force to the tracking direction T is generated by a current being applied to the tracking coils 4a and 4b which are placed within voids of the magnetic circuit formed by the magnet 7 and the yoke 8 and are fixed to the lens holder 2. By the generated actuation force to the tracking direction T, the lens holder 2 slidably moves to the tracking direction T through the four parallel wires 5a~5d.

Here, on the lens holder 2, notches 2a~2d are formed (the notch 2b is not shown in FIG. 1 since it is out of view), corresponding to portions supporting each of the one ends of the wires 5a~5d. Similarly, on the stationary member 6, notches 6a~6d are formed (the notch 6b is not shown in FIG. 1 since it is out of view), corresponding to portions supporting each of the other ends of the wire 5a~5d. The wires 5a~5d are partially exposed within the notches 2a~2d and 6a~6d. The lens holder 2, the stationary member 6 and the wires 5a~5d are integrally molded and when they are integrally molded, a mold enters inside of the notches 2a~2d and 6a~6d at the time of integral molding to abut with the wires 5a~5d. Thereby, positions of the wires 5a~5d are decided without being deformed.

Figure 5:
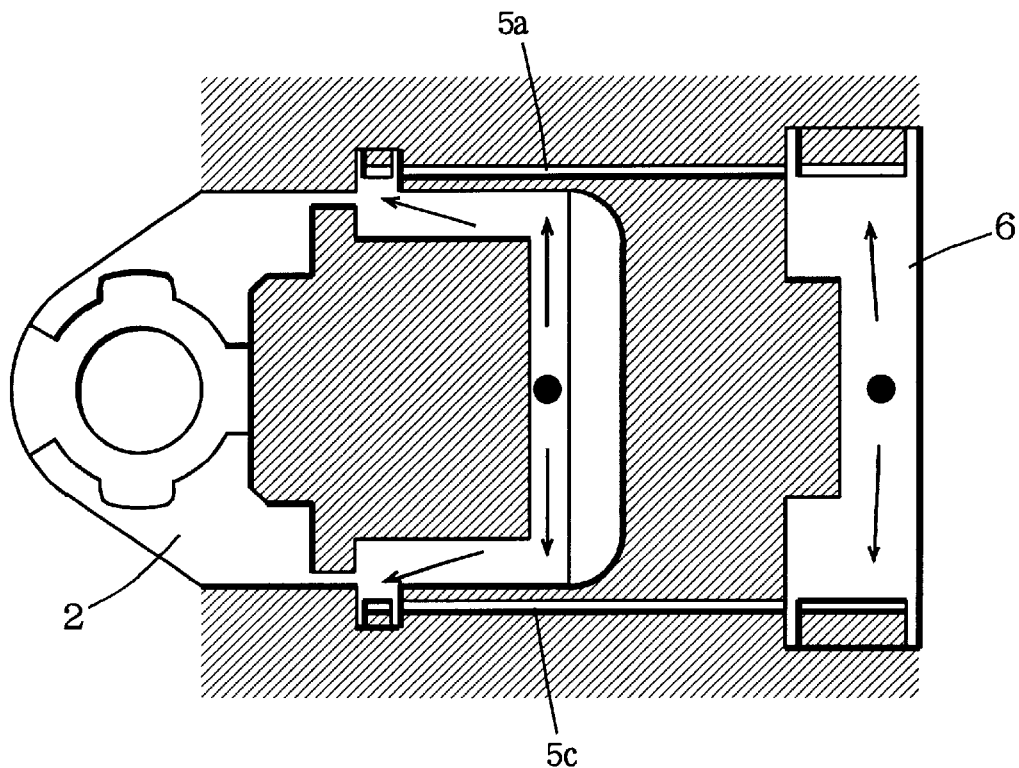
FIG. 5 is a top plan view of a main portion showing a state at a time of molding the objective lens actuator according to the first embodiment of the present invention.

FIG. 5 is a top plan view of a main portion showing a state of molding the objective lens actuator according to the first embodiment of the present invention. FIG. 5 shows the lens holder 2, the stationary member 6 and the wires 5a~5d which are integrally molded, gate positions of the mold to which an injection material is injected (illustrated by black points), directions of material flowing in the mold (illustrated by arrows) and a range of a main portion of mold (illustrated by diagonally shaded areas). When the objective lens actuator is molded by the mold as shown in FIG. 5, the wires (only 5a and 5c are shown in FIG. 5) are hard to be deformed since injection pressure of the material at the time of molding is received by the mold at parts of connecting portions between the wires and the lens holder 2 and at connecting portions between the wires and the stationary member 6. Therefore, when the mold is removed, the wires are hard to be deformed, making it possible to reduce the inclination during actuation and the degradation of the frequency response characteristic.

Figure 6:
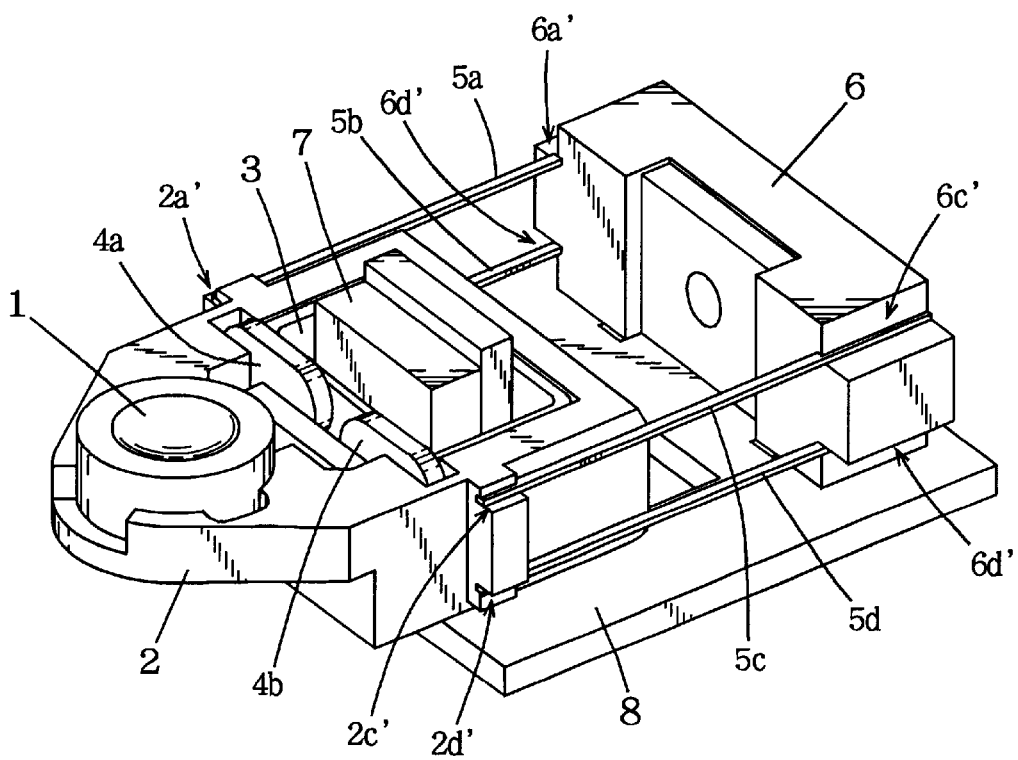
FIG. 6 is a perspective view showing the structure of an objective lens actuator according to a second embodiment of the present invention.
Figure 7:
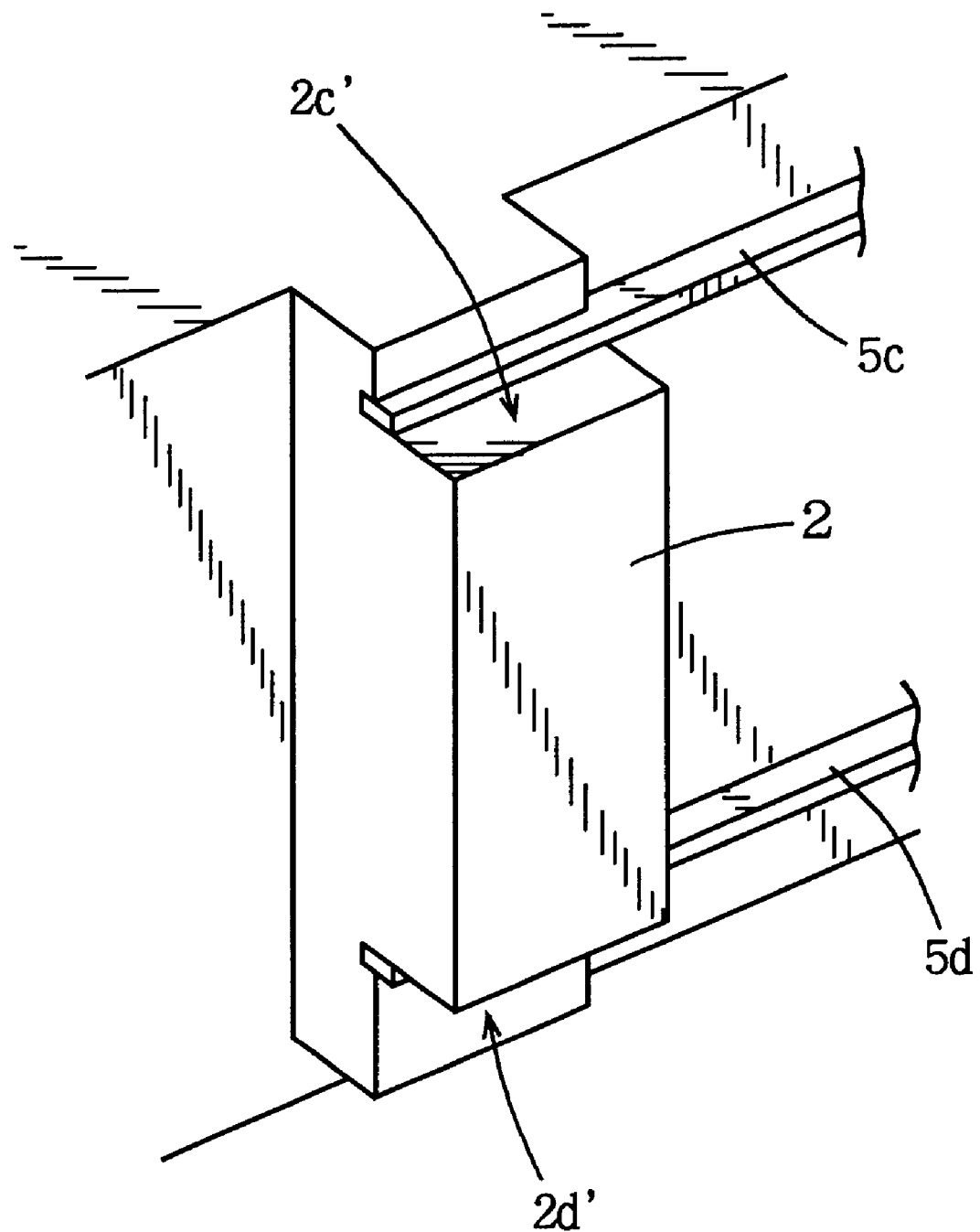
FIG. 7 is a perspective view showing the structure of main portions of the objective lens actuator according to the second embodiment of the present invention.

FIG. 6 is a perspective view showing the structure of an objective lens actuator according to a second embodiment of the present invention. FIG. 7 is a perspective view showing the structure of main portions of the objective lens actuator according to the second embodiment of the present invention. The basic structure and operation of the second embodiment are the same as the above-described first embodiment. Therefore, in FIG. 6 and FIG. 7, same reference numbers are provided with components which are the same as those in the first embodiment and the explanation of the components is omitted.

In the second embodiment, instead of the notches 2a~2d and 6a~6d in the first embodiment, step portions 2a'~2d' and 6a'~6d' are formed on the lens holder 2 and the stationary member 6. As is clear from FIG. 6 and FIG. 7, the step portions 2a'~2d' continuously expose one ends of the wires 5a~5d without any break in longitudinal direction. Similarly, the step portions 6a'~6d' continuously expose the other ends of the wires 5a~5d without any break in longitudinal direction. This makes the wires 5a~5d abut with the mold for the full length of the wires at the time of molding, thereby the possibility of the deformation of the wires becomes still lower than that in the first embodiment.

Although in the above-described embodiments, the notches or the step portions are provided on both of the lens holder 2 and the stationary member 6 to bring the wires 5a~5d into contact with the mold at the time of molding, the notches or the step portions may be provided on only one of the lens holder 2 and the stationary member 6.

While the invention has been described in detail, the foregoing description is in all aspects illustrative and not restrictive. It is understood that numerous other modifications and variations can be devised without departing from the scope of the invention.

What is claimed is:

1. An objective lens actuator actuating an objective lens for gathering light emitted from a light source on a recording surface of a disk-like recording medium in a radial direction parallel with the recording surface of the disk-like recording medium and in an optical axis direction perpendicular to the recording surface of the disk-like recording medium in order to record and/or read information, comprising:

a lens holder holding said objective lens;

a stationary member;

a plurality of elastic members which are integrally molded with said lens holder and said stationary member, one ends of which are buried in said lens holder and the other ends of which are buried in said stationary member, and which movably support the lens holder relative to the stationary member in said optical axis direction and in said radial direction; and an actuation force applying means applying actuation forces in said optical axis direction and said radial direction to said lens holder, wherein each of said elastic members has exposed portions generated by being in contact with a mold at a time of molding in portions where each of the elastic members is buried in said lens holder and/or said stationary member.

2. The objective lens actuator according to claim 1, wherein said exposed portions expose each of said elastic members for the full length of the portions where each of the elastic members is buried in said lens holder and/or said stationary member.

3. A method for producing an objective lens actuator, wherein said objective lens actuator comprises;

an objective lens for gathering light emitted from a light source on a recording surface of a disk-like recording medium in order to record and/or read information;

a lens holder holding said objective lens;

a stationary member;

a plurality of elastic members movably supporting said lens holder relative to said stationary member in a radial direction parallel with the recording surface of the disk-like recording medium and in an optical axis direction perpendicular to the recording surface of the disk-like recording medium; and an actuation force applying means applying actuation forces in said optical axis direction and said radial direction to said lens holder, each of said elastic members are integrally molded with said lens holder and said stationary member so that one end of each of the elastic members is buried in said lens holder and the other end of each of the elastic members is buried in said stationary member and parts of portions where each of said elastic members is buried in said lens holder and/or said stationary member are made contacted with a mold for molding at a time of said integral molding.

* * * * *